US 6,628,232 B1

United States Patent
Hynes et al.

(10) Patent No.: US 6,628,232 B1
(45) Date of Patent: Sep. 30, 2003

(54) GPS TRACKER

(75) Inventors: Mark W. Hynes, Sierra Vista, AZ (US); Barry C. Miller, Fort Huachuca, AZ (US); Mark S. Barrett, Fort Huachuca, AZ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/122,118

(22) Filed: Apr. 15, 2002

(51) Int. Cl.$^7$ ................................................ H04B 7/185
(52) U.S. Cl. ..................... 342/357.07; 342/357.06; 342/357.09; 701/213
(58) Field of Search ...................... 342/357.01, 357.06, 342/357.07, 357.09, 457; 701/207, 213, 215, 222

(56) References Cited

U.S. PATENT DOCUMENTS 5,223,844 A * 6/1993 Mansell et al. ............. 342/357
5,905,461 A * 5/1999 Neher ......................... 342/357
6,298,306 B1 * 10/2001 Suarez et al. ................ 701/213
6,301,545 B1   10/2001 Brodie
6,320,535 B1 * 11/2001 Hillman et al. ............ 342/357.1
6,339,745 B1    1/2002 Novik

* cited by examiner

*Primary Examiner*—Dao Phan
(74) *Attorney, Agent, or Firm*—Alan F. Klein

(57) ABSTRACT

A vehicle tracking system that includes a plurality of trackers, each adapted to be attached to a respective movable vehicle, and a remotely located controller for individually polling by radio each of the trackers to determine the position of the polled tracker. Each tracker includes a positioning receiver which receives satellite signals from a Global Positioning System and transmits a first positioning signal containing the position of the tracker to a micro controller unit. The micro controller unit receives the signal and transmits a second positioning signal containing the position of the tracker to a communicator. The communicator radios the second positioning signal to the remotely located controller to communicate the position of the tracker in response to a radioed polling signal from the remotely located controller.

19 Claims, 2 Drawing Sheets

GPS TRACKER

BACKGROUND OF THE INVENTION

This invention relates generally to methods of vehicle position location and more particularly to such methods involving reporting systems and wireless remote control.

Test engineers on missile range electronic proving grounds need a means of tracking moving vehicles to provide the engineers with increased visibility of test operations.

SUMMARY OF THE INVENTION

It is therefore an object of this invention to enable real time position tracking of moving vehicles during field test exercises.

This and other objects of the invention are achieved by a vehicle tracking system that includes a plurality of trackers each adapted to be attached to a respective movable vehicle and a remotely located control means for individually polling by radio each of the trackers to determine the position of the polled tracker. Each tracker includes a positioning receiver which receives satellite signals from a Global Positioning System and transmits a first positioning signal containing the position of the tracker to a micro controller unit. The micro controller unit receives the signal and transmits a second positioning signal containing the position of the tracker to a communication means. The communication means includes a second micro controller unit which radioes the second positioning signal to the remotely located control means by means of a data radio to communicate the position of the tracker in response to a radioed polling signal from the remotely located control means.

The use of a low cost off-the-shelf miniature positioning receiver permits the use of low cost, low power micro controller units to manage the passing of data from the receiver to the remotely located control means. Thus, the trackers can be implemented in a small, low-cost embodiment that is effective in a field test environment.

Additional advantages and features will become apparent as the subject invention becomes better understood by reference to the following detailed description when considered in conjunction with the accompanying drawings wherein:

DETAILED DESCRIPTION

Figure 1:
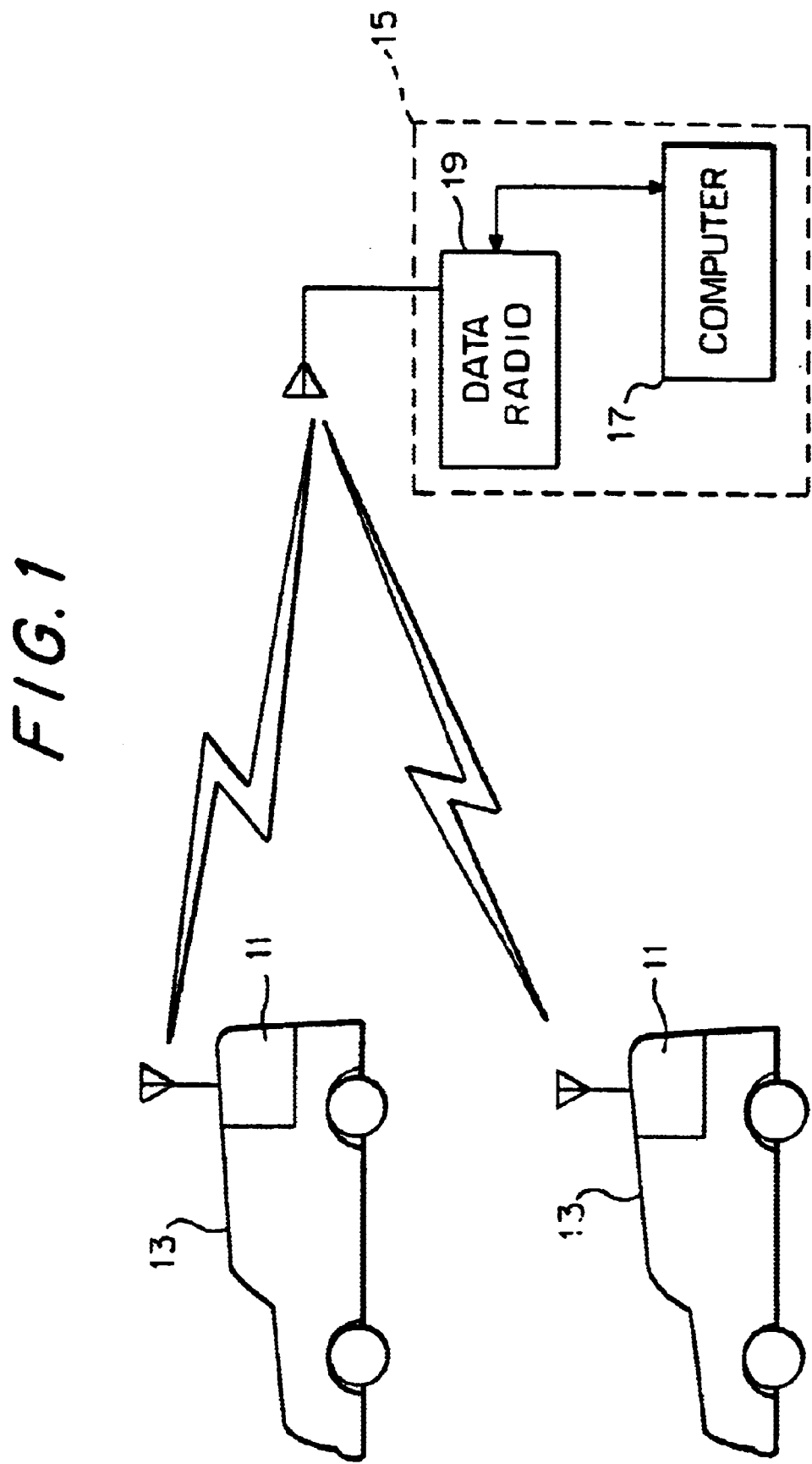
FIG. 1 is a block diagram of an embodiment of the vehicle tracking system of the invention.

Referring to the figures, FIG. 1 shows an embodiment of the vehicle tracking system of the invention. The vehicle tracking system includes a plurality of identical trackers 1 (two are shown) each mounted in a respective moving vehicle 13 to be tracked and a control means 15 at a location that is remote from the vehicles. While the remotely located control means 15 may take a variety of forms, conveniently it may include a computer 17 and a data radio 19 connected to the computer for commanding, controlling and displaying the status of the trackers (and the vehicles to which they are attached).

Figure 2:
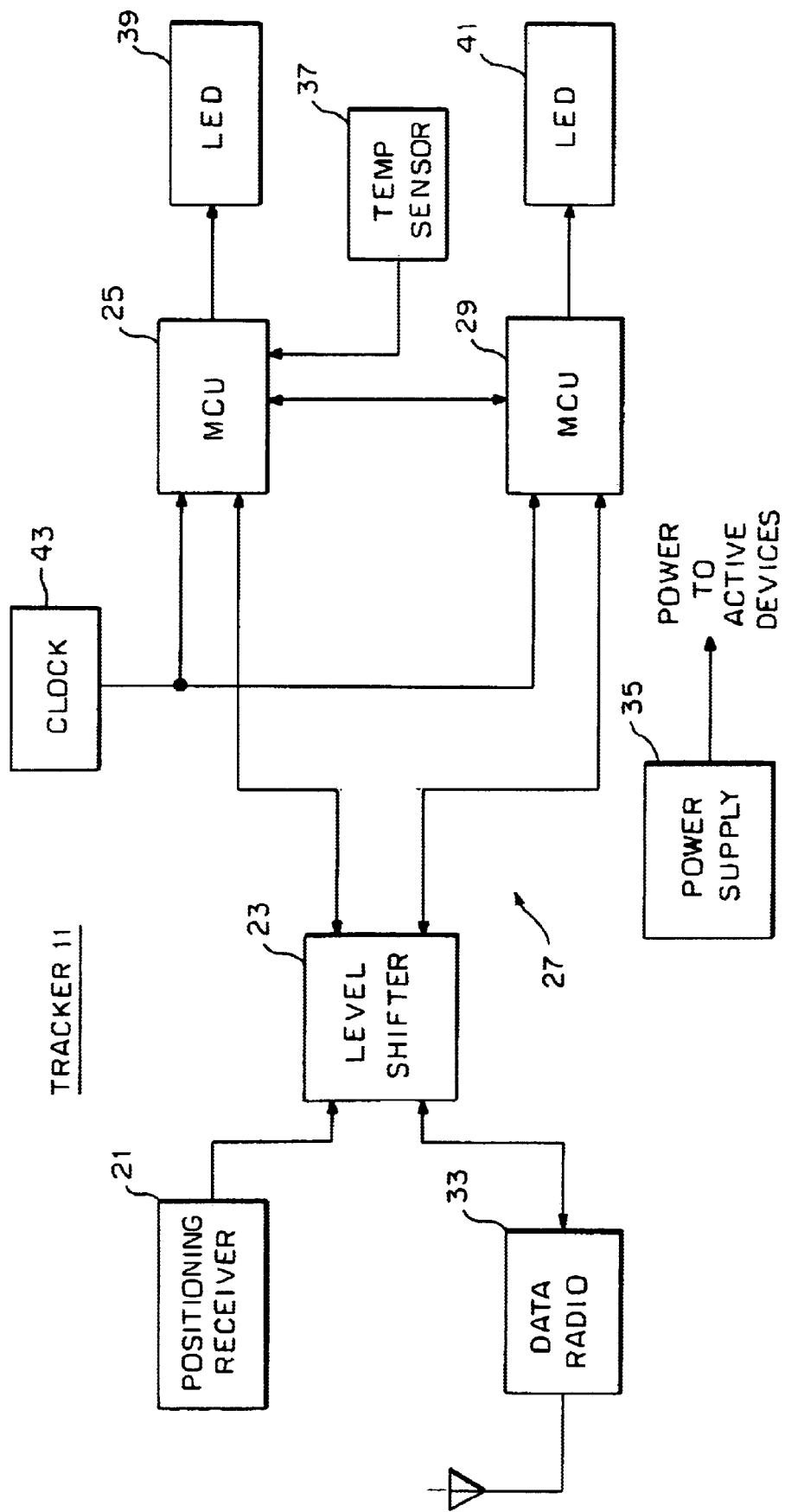
FIG. 2 is a block diagram of an embodiment of the tracker of the invention.

FIG. 2 shows the details of a tracker 11. Each of the trackers 11 includes a positioning receiver 21, such as a Garmin model 25 miniature GPS 12 channel receiver containing an antenna, a level shifter 23, such as a Maxim model MAX232A level shifter, connected to the positioning receiver 21, a first micro controller unit 25, such as a Microchip model PIC16F877 MCU, connected to the level shifter 23, and a communication means 27 connected to the first micro controller unit 25. While the communication means 27 may take a variety of forms, conveniently it may take the form of a second micro controller unit 29, such as a Microchip model PIC16F877 MCU, connected to the first micro controller unit 25 by way of a parallel interface to allow communication between them, the level shifter 23 also connected to the second micro controller unit 29, and a data radio 33, such as a Freewave model DGR-115H or an Electrocom model DT-450 radio, connected to the level shifter 23. The micro controller units 25 and 29 each have built-in universal asynchronous receiver-transmitters for communicating with the positioning receiver 21 and the data radio 33. They are programmed with firmware. The tracker 11 derives its power from a 5 volt direct current power supply 35, which may be made up of a 13.8 volt battery connected in series with a voltage regulator such as a Texas Instruments model OA7895C voltage regulator and a filter consisting of an inductor and multiple capacitors. A temperature sensor 37 such as a Dallas semiconductor DS1624S sensor, is connected to the first micro controller unit 25 by way of a simple synchronous serial interface. A first light emitting diode 39 is connected to the first micro controller unit 25 and a second light emitting diode 41 is connected to the second micro controller unit 29. A clock 43, such as a CTS Reeves model CB3-3C-4.0000-T crystal-based clock oscillator, is connected to the micro controller units 25 and 29.

In operation, in each tracker 11 attached to a respective moving vehicle 13, satellite signals from a Global Positioning System (not shown) are received at the positioning receiver 21. The positioning receiver 21 transmits a first positioning signal describing the time and its location once per second to the first micro controller unit 25 by way of the level shifter 23 which converts the ±10 volt logic levels compatible with the positioning receiver's RS-232 interface to 5 volt logic levels compatible with the first micro controller unit. The first positioning signal is in the form of two sentences, the GPRMC and the PGRME, formatted as ASCII data. The GPRMC is a standard National Marine Electronics Association (NMEA) sentence. The protocol is described in the NMEA 0183 ASCII interface specification, available from NMEA at P.O. Box 50040, Mobile, Ala. 36605, herein incorporated by reference. It provides the position fix, and the status of the fix (valid or not) and the time of the fix. The PGRME sentence is a Garmin proprietary sentence described in the Garmin operating manual, herein incorporated by reference. It provides the estimated horizontal position error. This gives the user an indication of the accuracy of the reported position. Each time the first micro controller unit 25 receives a complete set of sentences from the positioning receiver 21 it illuminates the light emitting diode 39 to indicate to the user that it is functioning correctly. The temperature sensor 37 also provides the internal temperature of the tracker in degrees centigrade to the first micro controller unit 25. The first micro controller unit 25 receives the temperature information and the first positioning signal and transmits a second positioning signal to the second micro controller unit 29. The second positioning signal is a formatted string representing the time, position, temperature, number of satellites, and errors and is completed once per second. The computer 17 in the remotely located control means 15 is programmed to poll the trackers by way of the data radio 19 to determine their positions. The second micro controller unit 29 listens for an address in the poll string that represents its identification number. The computer 17 uses unique unit identification from U001 to U999 so there is capacity to track up to 999 individual vehicles simultaneously. The second micro controller unit 29 receives the polling signal by way of the data radio 33 and the level shifter 23 in addition to the second positioning signal from the second micro controller unit 29 and when it recognizes it has been polled it responds to the command by radioing the second positioning signal to the control means 15 by way of the level shifter 23 and the data radio 33 to communicate the real-time position of the positioning receiver 21 (and of the vehicle 13 to which the tracker 11 is attached). Each time the second micro controller unit 29 receives a poll with matching identification number, it illuminates the second light emitting diode 41 to indicate to the user that it is functioning correctly. In this way, the position locations of a plurality of moving vehicles may be monitored and reported by the computer 17.

In an actual test of the vehicle tracking system, two vehicles were driven across a test course while their positions were monitored and reported by the remotely located computer. The test course covered 400 square kilometers. The accuracy of the vehicle location was within 10 meters at all times.

It is obvious that many modifications and variations of the present invention are possible in light of the above teachings. It is therefore to be understood that within the scope of the appended claims, the invention may be practiced otherwise than as described.

What is claimed is:

1. A vehicle tracking system comprising:
   a plurality of trackers each adapted to be attached to a respective movable vehicle, and
   remotely located control means for individually polling by radio each one of the trackers to determine the position of the polled tracker,
   each tracker comprising
      a positioning receiver for receiving satellite signals from a Global Positioning System and transmitting a first positioning signal containing the position of the tracker;
      a first micro controller unit connected to the positioning receiver for receiving the first positioning signal and transmitting a second positioning signal containing the position of the tracker; and
      communication means connected to the first micro controller unit for receiving the second positioning signal and, in response to a radioed polling signal from the remotely located control means, radioing the second positioning signal to the control means to communicate the position of the tracker.

2. The system recited in claim 1 wherein the communication means includes a second micro controller unit.

3. The system recited in claim 2 wherein the communication means includes a data radio connected to the second micro controller unit.

4. The system recited in claim 3 wherein the remotely located control means includes a computer.

5. The system recited in claim 4 wherein the remotely located control means includes a data radio connected to the computer.

6. The system recited in claim 5 including a level shifter connected between the positioning receiver and the first micro controller unit.

7. The system recited in claim 5 including a level shifter connected between the second micro controller unit and the data radio.

8. The system recited in claim 7 including a temperature sensor connected to the first micro controller unit.

9. The system recited in claim 8 including a light emitting diode connected to the first micro controller unit.

10. The system recited in claim 7 including a light emitting diode connected to the second micro controller unit.

11. A vehicle tracker for communicating the position of the vehicle to a remotely located control means comprising:
    a positioning receiver adapted to be attached to the vehicle for receiving satellite signals from a Global Positioning System and transmitting a first positioning signal containing the position of the tracker,
    a first micro controller unit connected to the positioning receiver for receiving the first positioning signal and transmitting a second positioning signal containing the position of the tracker and
    communication means connected to the first micro controller unit for receiving the second positioning signal and, responsive to a radioed polling signal from the remotely located control means, radioing the second positioning signal to the control means to communicate the position of the tracker.

12. The tracker recited in claim 11 wherein the communication means includes a second micro controller unit.

13. The tracker recited in claim 12 wherein the communication means includes a data radio connected to the second micro controller unit.

14. The tracker recited in claim 13 including a level shifter connected between the positioning receiver and the first micro controller.

15. The tracker recited in claim 13 including a level shifter connected between the second micro controller unit and the data radio.

16. The tracker recited in claim 13 including a temperature sensor connected to the first micro controller unit.

17. The tracker recited in claim 16 including a light emitting diode connected to the first micro controller unit.

18. The tracker recited in claim 17 including a light emitting diode connected to the second micro controller unit.

19. A method of tracking moving vehicles comprising the steps of:
    attaching a plurality of trackers to respective movable vehicles,
    in each tracker, receiving at a positioning receiver satellite signals from a Global Positioning System,
    transmitting a first positioning signal containing the position of the tracker from the positioning receiver to a micro controller unit,
    receiving at the micro controller unit the first positioning signal,
    transmitting a second positioning signal containing the position of the tracker from the micro controller unit,
    receiving the second positioning signal, and
    responsive to a polling signal from a remotely located control means, radioing the second positioning signal to the control means to communicate the position of the tracker.

* * * * *